Figure 1:
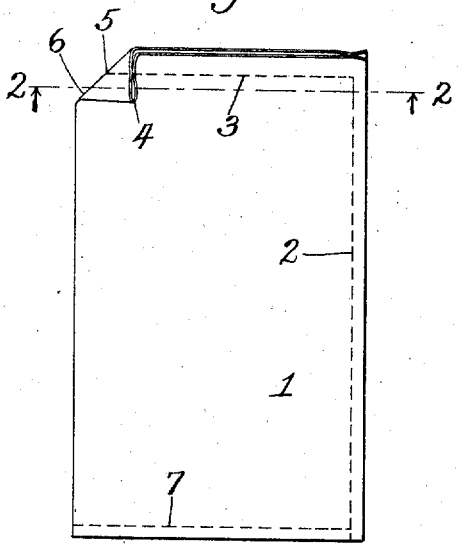

No. 12,062. Reissued Dec. 16, 1902.

A. M. BATES.

SACK, BAG, OR OTHER FLEXIBLE RECEPTACLE.

(Application filed Nov. 15, 1902.)

Witnesses.

Edward T. Wray

Howard L. Kroft

Inventor.

A. M. Bates, by Parker Parks

Attorney's.

UNITED STATES PATENT OFFICE.

ADELMER M. BATES, OF CLEVELAND, OHIO.

SACK, BAG, OR OTHER FLEXIBLE RECEPTACLE.

SPECIFICATION forming part of Reissued Letters Patent No. 12,062, dated December 16, 1902.

Original No. 623,199, dated April 18, 1899. Application for reissue filed November 15, 1902. Serial No. 131,490.

*To all whom it may concern:*

Be it known that I, ADELMER M. BATES, a citizen of the United States, residing at Cleveland, in the county of Cuyahoga and State of Ohio, have invented certain new and useful Improvements in Sacks, Bags, or other Flexible Receptacles, of which the following is a full, clear, and exact specification.

My invention relates to sacks, bags, and other flexible receptacles for holding granular or powdered substances, such as salt, sugar, flour, meal, tea, coffee, ore, grain, &c.; and it has for its primary object to provide improved and simple means, located at the corner, whereby the bag or receptacle may be entirely filled after the stitching, pasting, or other securing operation is entirely completed, and at the same time to automatically prevent the contents from afterward escaping through the filling-aperture, thereby enabling the sack or bag being stitched or secured entirely by machinery, with a resultant saving of material, labor, and expense.

In filling a bag or sack with granular material the latter forms itself into a pyramid, and consequently if the bag be filled through a filling-tube or small aperture inserted at its center the pyramid may rise in the bag until it chokes off the supply; but the upper corners or shoulders of the bag may not be filled without jostling or agitating the bag. Hence another object of my invention is to provide a bag or sack with a simple filling-aperture so located that when filled through a filling-tube the material will rise uniformly in the bag and fill all the corners without the necessity of agitating the bag during the filling operation.

Another and subsidiary object of my invention is to provide the bag with a filling-aperture of such construction that the bag may be entirely stitched on all sides sufficiently to contain the material and the bag filled without turning it right side out, as heretofore, whereby the additional handling of the bag necessary for stitching up the end of the bag after it is turned will be avoided and an appropriate and cheap receptacle for carrying coarse material—such as granulated ore, coal, &c.—will be provided.

In carrying out my invention I provide the bag or sack at the corner with a comparatively small filling-aperture, around which are formed or located valvular folds or lips which will open to admit the end of a filling funnel or spout, but will automatically close under the pressure of the contents when the funnel is withdrawn, and thus prevent leakage with a resistance increasing in direct ratio to the pressure of the contents thereagainst.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

Figure 3:
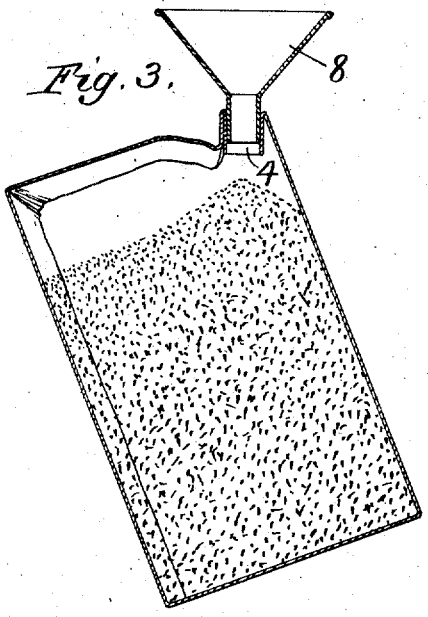
Figure 2:
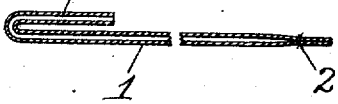
Figure 5:
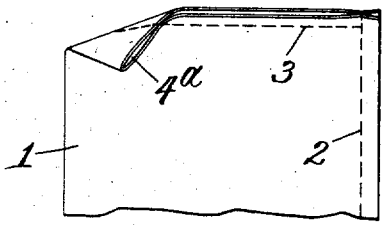
Figure 4:
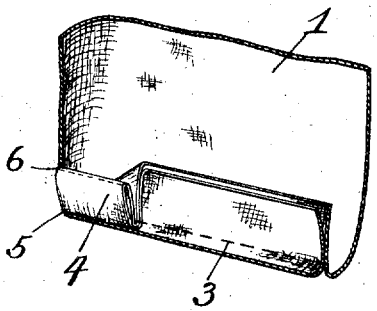
Figure 6:
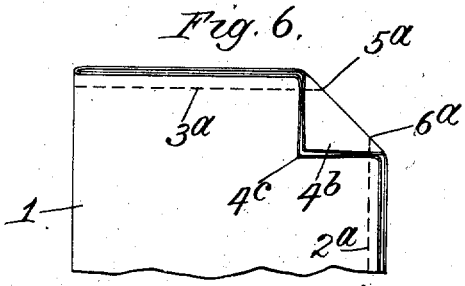

In the said drawings, Figure 1 is a side view of a bag or sack embodying my invention. Fig. 2 is a section thereof on the line 2 2, Fig. 1. Fig. 3 is a vertical section showing the manner of filling the bag. Fig. 4 is a perspective view of a portion of the bag looking down thereinto. Fig. 5 is a view similar to Fig. 1, illustrating a slight modification; and Fig. 6 is a view similar to Fig. 1, illustrating a still further modification.

The bag or sack may of course be composed of any of the materials from which such articles are usually made; but when composed of cotton cloth or other fabric it is desirable in some instances that the securing of the edges be effected by stitching. Heretofore it has been customary to make sacks of a piece of folded cloth having a line of sewing-machine stitching extending across one end and down one side, thus forming a bag open at one end, the lower end being usually closed by hand-stitching after the bag is filled. In the accompanying drawings I have shown as an example of my invention a bag of this character, 1 representing the body of the bag, and 2 the line of sewing-machine stitching extending down one side to secure the edges of the folded cloth together. The line of stitching 2, however, is usually and more conveniently a mere continuation of the line of stitching 3, which closes the top or one end of the bag. Before this line of stitching 3 is run the corner of the bag adjacent to its folded side is turned over, as clearly shown in Fig. 1, at substantially right angles to its edges, and the line of stitching 3 is started from the diagonal side of its turned-down corner and is carried across four thicknesses of material thus formed straight to the opposite side of the bag and then turned down the line of stitching 2. By thus folding over the corner of the bag it will be seen that I form a tubular neck or valvular fold 4, surrounding a filling-aperture that is left in the corner of the bag between the points 5 and 6.

If the purposes for which the bag is intended do not make it objectionable to have the raw edges of the fabric along the line of stitching on the outside of the bag, the line of stitching 2 may be continued around the lower end of the bag, as shown at 7, so as to completely close the bag on all sides with the exception of the filling-aperture between the points 5 and 6.

When the bag is to be filled, a filling tube or funnel 8 is introduced through the neck 4 and the bag preferably held in a diagonal position, as indicated in Fig. 3, so that the conical formation of the material will rise into the upper corner of the bag and completely fill it without the necessity of jostling. When the filling-funnel is withdrawn, the neck 4 will fold back to its original position, as shown in Fig. 1, this tendency being induced by the line of stitching 3 thereacross, and thus prevent the escape of the material from the bag.

If it should be desired to turn the raw edges of the material into the bag before it is filled, then in that event the line of stitching 7 will be deferred until the bag is turned inside out, bringing the tubular neck 4 inside the bag, as shown in Fig. 4. When the bag thus turned is to be filled, the filling-funnel is inserted through an aperture at the corner and the tube 4, as before explained, and when the tube is withdrawn the tubular neck 4 will rest against one side of the bag, as shown in Fig. 4, and prevent the material from escaping, and the neck 4 in being thus doubled on itself, as it were, and also turned wrong side out constitutes a very efficient closure for preventing the escape of very fine granules, and the pressure of the material against the neck will seal it all the tighter.

In applying my invention to large sacks, where the material wasted between the line of stitching 3 and the upper end of the bag would be a desideratum, I employ the construction illustrated in Fig. 5, which consists in turning the corner of the bag in such a manner that the lower edge of the fold will be at an acute angle to the left-hand side of the bag, and I then start the stitching 3 at about the same point on the corner, but carry it upwardly on a curved line across the folded corner, so as to bring the closure to the edges of the material at the end, thus forming a tubular neck or valvular fold $4^a$, which is flaring at one end.

In the form shown in Fig. 6 the valvular fold is produced where the two edges of the material are brought together or, in other words, at the corner of the bag where the lines of stitching 2 3 meet, and the valvular fold instead of being in the form of a tube is in the form of two flaps or lips $4^b$ $4^c$, constituted by the two corners of the folded fabric. In accomplishing this the line of stitching at the end of the bag (indicated at $3^a$) is run from the folded side of the bag entirely across the end and across one corner of the flaps $4^b$ $4^c$, and then the stitching is run back down the other corner of the flaps and carried down the side of the bag, as shown at $2^a$, thus leaving a filling-aperture between the points $5^a$ $6^a$, which is surrounded or guarded by the two valvular lips or folds constituted by the said flaps, the folds or lips being always held against one side of the bag by reason of the stitching being carried through them and the two other thicknesses of material.

My invention also forms an appropriate means for the filling of paper and, in fact, all other bags or sacks in advance of sale, inasmuch as the sack may be appropriately secured all around by the manufacturer and shipped to the grocer and other dealers ready to be filled, thus forming a tight package when filled and relieving the grocer or other user of the necessity of securing the edges of the end, which is an operation difficult to accomplish properly after the contents have been inserted, owing to the necessity of doing it by hand.

The idea of placing the valve at the corner of the bag is shown and fully described in my original patent, No. 623,198, and is claimed in the reissue thereof, and hence is not claimed here; but the form of construction, broadly considered, by which the corner-valve is in this application produced is the proper subject-matter of this application.

Having thus described my invention, what I claim as new therein, and desire to secure by Letters Patent, is—

1. As a new and useful article of manufacture, a bag or sack having one corner turned down upon itself and being secured to the side of the bag, the sides of the bag at a point between the corners of said turned-down corner being left open to form a filling-aperture and said turned-down corner constituting a valvular fold for closing said aperture.

2. As a new and useful article of manufacture, a bag or sack having its corner folded upon itself and a line of stitching which closes one side of the bag being carried across said corner, the bag at a point between said line of stitching and the corner of said fold being left unsecured to form a filling-aperture.

3. As a new and useful article of manufacture, a bag or sack composed of a piece of material folded upon itself and secured around its free edges and having one corner adjacent to the doubled edge of the material folded down and secured to the side of the bag, said corner being left open for a short distance to form a filling-aperture.

ADELMER M. BATES.

Witnesses:
G. E. KAPPLER,
GEO. D. ADAMS.